United States Patent
Onoe et al.

(10) Patent No.: US 7,221,639 B2
(45) Date of Patent: May 22, 2007

(54) PICKUP DEVICE

(75) Inventors: Atsushi Onoe, Saitama (JP); Yasuo Cho, 4-5-304, Komegafukuro 2-chome, Aoba-ku, Sendai-shi, Miyagi (JP)

(73) Assignees: Pioneer Corporation, Tokyo (JP); Yasuo Cho, Miyagi (JP)

( * ) Notice: Subject to any disclaimer, the term of this patent is extended or adjusted under 35 U.S.C. 154(b) by 683 days.

(21) Appl. No.: 10/615,415

(22) Filed: Jul. 9, 2003

(65) Prior Publication Data

US 2004/0047245 A1    Mar. 11, 2004

(30) Foreign Application Priority Data

Jul. 9, 2002    (JP)    ............................. 2002-200077

(51) Int. Cl.
    *G11B 7/00*    (2006.01)
(52) U.S. Cl. ..................................... 369/126
(58) Field of Classification Search ..................... None
    See application file for complete search history.

(56) References Cited

U.S. PATENT DOCUMENTS

| 2,872,529 | A | | 2/1959 | Hollmann et al. | |
|---|---|---|---|---|---|
| 4,320,491 | A | | 3/1982 | Rustman | ..................... 369/126 |
| 4,455,638 | A | | 6/1984 | Wilson | ........................ 369/126 |
| 4,489,278 | A | | 12/1984 | Sawazaki | ..................... 324/457 |
| 5,418,029 | A | | 5/1995 | Yamamoto et al. | ........ 428/64.2 |
| 5,481,527 | A | * | 1/1996 | Kasanuki et al. | ........... 369/126 |
| 5,488,602 | A | | 1/1996 | Yamano et al. | ............. 369/126 |
| 5,646,932 | A | | 7/1997 | Kuribayashi et al. | ....... 369/126 |
| 5,751,685 | A | | 5/1998 | Yi | .............................. 369/126 |
| 5,777,977 | A | | 7/1998 | Fujiwara et al. | ............ 369/126 |
| 5,808,977 | A | | 9/1998 | Koyanagi et al. | ........... 369/127 |
| 5,914,920 | A | | 6/1999 | Yokogawa | ................ 369/275.3 |
| 5,946,284 | A | | 8/1999 | Chung et al. | ................ 369/126 |
| 5,985,404 | A | | 11/1999 | Yano et al. | |
| 6,197,989 | B1 | | 3/2001 | Furukawa et al. | .......... 556/450 |
| 6,477,132 | B1 | * | 11/2002 | Azuma et al. | .............. 369/126 |
| 6,510,130 | B2 | | 1/2003 | Hayashi et al. | .......... 369/275.3 |
| 6,515,957 | B1 | * | 2/2003 | Newns et al. | ................ 369/126 |

(Continued)

FOREIGN PATENT DOCUMENTS

GB    644 426 A    10/1950

(Continued)

OTHER PUBLICATIONS

62th Japan Society of Applied Physics Lecture Meeting 2001.9 Aichi Institute of Technology) 12p-ZR-2.

(Continued)

*Primary Examiner*—Thang V. Tran
(74) *Attorney, Agent, or Firm*—Nixon & Vanderhye, PC (57)    ABSTRACT

An example pickup device is provided with: an arm; a gimbal holding device disposed on one end portion of the arm; a gimbal held by the gimbal holding device with a probe set in its center portion; and a motor of rotational type for rotating the arm around a rotating shaft. The probe, which is disposed on one end of the arm, is rotated in the radial direction of a dielectric recording medium by the rotation of the motor, causing accurate and quick tracking control and track access control.

13 Claims, 8 Drawing Sheets

U.S. PATENT DOCUMENTS

| | | | | |
|---|---|---|---|---|
| 6,653,630 B2 * | 11/2003 | Rosenman et al. | ......... | 250/306 |
| 6,762,402 B2 * | 7/2004 | Choi et al. | .................. | 250/234 |
| 6,841,220 B2 | 1/2005 | Onoe et al. | ................ | 428/66.7 |
| 6,912,193 B2 | 6/2005 | Cho et al. | .................... | 369/126 |
| 6,965,545 B2 | 11/2005 | Hino et al. | ............. | 369/13.54 |
| 7,065,033 B2 | 6/2006 | Onoe et al. | ................ | 369/126 |
| 7,149,180 B2 | 12/2006 | Onoe et al. | ................ | 369/276 |
| 2002/0105249 A1 | 8/2002 | Yoshida et al. | ............ | 310/311 |
| 2002/0118906 A1 | 8/2002 | Onoe | ......................... | 385/14 |
| 2002/0131669 A1 | 9/2002 | Onoe et al. | ................... | 385/14 |
| 2003/0021213 A1 | 1/2003 | Hagiwara | ................... | 369/101 |
| 2003/0053400 A1 | 3/2003 | Cho et al. | ................... | 369/126 |
| 2004/0027935 A1 | 2/2004 | Cho et al. | ................... | 369/126 |
| 2004/0042351 A1 | 3/2004 | Onoe et al. | ............ | 369/13.01 |
| 2004/0090903 A1 | 5/2004 | Cho et al. | ................... | 369/126 |
| 2004/0105373 A1 | 6/2004 | Maeda et al. | .............. | 369/101 |
| 2004/0105380 A1 | 6/2004 | Cho et al. | ................... | 369/126 |
| 2004/0114913 A1 | 6/2004 | Kume | ....................... | 386/125 |
| 2004/0252621 A1 | 12/2004 | Cho et al. | ................... | 369/126 |
| 2004/0263185 A1 | 12/2004 | Cho et al. | ................... | 324/636 |
| 2005/0047288 A1 | 3/2005 | Maeda et al. | ........... | 369/53.25 |
| 2005/0098532 A1 | 5/2005 | Onoe et al. | ................... | 216/22 |
| 2005/0099895 A1 | 5/2005 | Maeda et al. | ........... | 369/13.01 |
| 2005/0122886 A1 | 6/2005 | Takahashi et al. | .......... | 369/126 |

FOREIGN PATENT DOCUMENTS

| | | |
|---|---|---|
| GB | 1 484 256 | 9/1977 |
| JP | 56-107338 | 8/1981 |
| JP | 57-200956 | 12/1982 |
| JP | 8075806 | 3/1996 |
| JP | 10-334525 | 12/1998 |
| JP | 2003085969 | 3/2003 |

OTHER PUBLICATIONS

Kazuta et al, "Determination of crystal polarities of piezoelectric thin film using scanning nonlinear dielectric microscopy", Journal of European Ceramic Society 21 (2001) 1581-1584.

The Institution of Electrical Engineers, Stevenage, GB; Jun. 1, 2002; Hiranaga et al, "Nano-sized inverted domain formation in stoichiometric LiTaO/sub3/single crystal using Scanning Nonlinear Dielectric Microscopy", XP002292217.

Cho et al, "Scanning nonlinear dielectric microscopy with nanometer resolution", Journal of European Ceramic Society 21 (2001) 2131-2134.

Cho et al., Nano domain engineering using scanning nonlinear dielectric microscopy, Oct. 29, 2001, IEE-NANO 2001, pp. 352-357.

* cited by examiner

PICKUP DEVICE

BACKGROUND OF THE INVENTION

1. Field of the Invention

The present invention relates to a pickup device used for a dielectric recording/reproducing apparatus for recording/reproducing information with high density in/from microdomains in a dielectric substance.

2. Description of the Related Art

As high-density, large-capacity recording/reproducing apparatuses of randomly accessible type, there are known an optical disk apparatus and a hard disc drive (HDD) apparatus. Moreover, a recording/reproducing technique using a scanning nonlinear dielectric microscopy (SNDM) for the nanoscale analysis of a dielectric (ferroelectric) material has been recently proposed by the inventors of the present invention.

In optical recording, which uses an optical pickup with a laser as a light source, data is recorded by forming pits that are concavo-convex on a disk surface or by forming the crystal phase of a phase shift medium, and the data is reproduced by using the difference in the reflectance of amorphous phases or using the magneto optical effect. However, the pickup is large, which is not appropriate for high-speed reading, and the size of the recording pit is defined by the diffraction limit of light, so that its recording density is limited to 50 G bit/inch$^2$.

In the longitudinal recording of magnetic recording as represented by the HDD, a magnetic resistance (MR) head has been recently realized using giant magnetic resistance (GMR) and its recording density is expected to be larger than that of the optical disk by using perpendicular magnetic recording. However, the recording density is limited to 1 T bit/inch$^2$ due to thermal fluctuation of magnetic recording information and the presence of a Bloch wall in a portion in which a code or sign is reversed or changed, even if patterned media are used considering the above cause.

Using the SNDM to measure a nonlinear dielectric constant of a ferroelectric material, it is possible to detect the plus and minus of a ferroelectric domain. Moreover, the SNDM is found to have sub-nanometer resolution using an electrically conductive cantilever (or probe) which is used for an atomic force microscopy (AFM) or the like and which is provided with a small probe on its tip portion. In the SNDM, a resonance circuit is formed with the probe, an inductor and an oscillator connected with the probe, a capacitance of the dielectric (ferroelectric) material just under the probe, and a return electrode, which is placed near the tip portion of the probe, for returning an alternating electric field from the tip portion of the probe through the dielectric (ferroelectric) material. As described above, the conventional SNDM is designed to be an analysis apparatus in which the return electrode used is a metal conductor of a ring shape of 7 mm outer diameter, 3 mm inner diameter, and about 0.5 mm thickness, placed so as to surround the tip portion of the probe.

However, the above-described SNDM has not been specially developed in view of a recording/reproducing apparatus and thus have such a problem that the probe is large or that assembling is complicated. Moreover, if it has a plurality of probes in order to increase a data transfer rate, the complication increases more.

SUMMARY OF THE INVENTION

It is therefore an object of the present invention to provide a pickup device, used for a dielectric recording/reproducing apparatus, equipped with a recording/reproducing head for recording/reproducing data in/from a dielectric recording medium, having a simple structure, easy to produce, and appropriate for mass production.

The above object of the present invention can be achieved by a pickup device for a dielectric recording/reproducing apparatus with a dielectric material as a recording medium, provided with: a first electrode for applying an electric field to the dielectric material; an electrode holding member for holding the first electrode; an arm portion equipped with the electrode holding member; and a rotating mechanism for rotating the arm portion.

The pickup device of the present invention is a device for controlling a position of the first electrode and a tracking operation of the first electrode. The first electrode is, for example, a probe. The pickup device is used for recording information or data in the recording medium using a dielectric material (referred to as a dielectric recording medium) or reproducing information recorded in the dielectric recording medium. A technique that information or data is recorded in the dielectric material by applying an electric field to the dielectric material is developed. In this technique, the electric field stronger than the coercive electric field of the dielectric material is applied to the dielectric material. By this, a polarization direction of the dielectric material is changed and set. By applying the electric field corresponding to information or data to be recorded, the information of data can be recorded to the dielectric material. The pickup device of the present invention is used in such technique. The pickup device is provided with: the first electrode (probe) on one end of the arm which rotates around a rotating shaft of the rotation mechanism; and the electrode holding member for holding the probe. The probe (first electrode) serves as a recording/reproducing head. The probe swings in a direction perpendicular to the track of the dielectric recording medium to perform track search and tracking servo. According to the pickup device of the present invention, it is possible to realize the pickup device for dielectric recording with a simple structure. Moreover, the pickup device of this type can be easily produced and is suitable for mass-production.

The pickup device of the present invention can be applied to any type of dielectric recording medium, such as a disc-shaped dielectric recording medium with its tracks placed concentrically or spirally and a rectangular dielectric recording medium with its tracks placed linearly. Incidentally, with respect to the shape of the first electrode for applying an electric field, a pin shape or needle-shape, the cantilever-shape, and the like are known as specific structures. The first electrode having any one of these shapes is collectively referred to as the "probe" in the present application as occasion demands.

In one aspect of the pickup device of the present invention, the electrode holding member has a gimbal structure.

According to this aspect, a gimbal has the probe fixed in its center and maintains itself substantially parallel to a recording surface of the dielectric recording medium. The gimbal transforms in the vertical direction, pitch direction and roll direction so as to absorb the irregularity or vibration of the recording surface of the dielectric recording medium or an inclination of the recording surface caused in an assembling. The gimbal has a shape with high tracking capability for tracking control of the probe.

In another aspect of the pickup device of the present invention, the electrode holding member contains a conductive member and is mounted on one end of the arm portion via an insulating member.

According to this aspect, the probe and electrode holding member can be insulated from the arm in electricity. Moreover, the electrode holding member contains a conductive member, so that it is possible to send an electrical signal to the probe and receive an electrical signal from the probe via the electrode holding member. Since the probe is extremely small, it is not easy to send an electrical signal to the probe and receive an electrical signal from the probe directly. According to this aspect of the present invention, the sending and receiving of electric signals for the probe become easy.

In another aspect of the pickup device of the present invention, the electrode holding member and the first electrode are formed in one piece.

According to this aspect, the small probe and the electrode holding member are prepared from the same material, so that maintaining the probe's shape and placing it can be easily performed with high accuracy.

In another aspect of the pickup device of the present invention, the pickup device is provided with a second electrode for returning a high-frequency electric field applied from the first electrode to the dielectric recording medium, on a surface of the insulating member facing to the dielectric recording medium.

According to this aspect, a return electrode for returning a high-frequency electric field applied from the probe is provided on the insulating member for mounting the electric holding member onto the arm portion. The return electrode can be prepared by conductive thin-film formation technique. By taking the electric continuity of this return electrode and the arm portion, it is possible to take the arm portion as one portion of the return electrode.

In another aspect of the pickup device of the present invention, the electrode holding member contains an insulating member.

According to this aspect, the electrode holding member is prepared with an insulating member such as resin materials. The probe can be insulated from the arm portion in electricity through the electrode holding member. Therefore, it is possible to use the arm portion as the return electrode.

In another aspect of the pickup device of the present invention, the pickup device is provided with a second electrode for returning a high-frequency electric field applied from the first electrode to the dielectric recording medium, around the electrode holding member.

In this aspect, the second electrode is the return electrode. According to this aspect, the return electrode can be placed at a position suitable for returning a high-frequency electric field applied from the probe.

In another aspect of the pickup device of the present invention, one end of the arm portion is used as the second electrode.

According to this aspect, with respect to the arm containing a conductive material, the second electrode is formed in one piece with and on the one end of the arm portion on which the electrode holding member is mounted. In this case, the second electrode does not have to surround the electrode holding member, but its shape is determined so that most part of the one end of the arm is equally taken as the return electrode.

In another aspect of the pickup device of the present invention, the electrode holding member is provided with a plurality of first electrodes.

According to this aspect, recording/reproducing operations can be performed on a plurality of recording tracks at a time, so that a data transfer rate increases. Moreover, in the case that the electrode holding member is made by using an insulating material it is possible to insulate the probes from each other in electricity. Furthermore, the common return electrode can be used as electrodes for returning a high-frequency electric field applied from respective probes. For example, the one end of the arm is preferably used as the return electrode.

In another aspect of the pickup device of the present invention, the pickup device is provided with: an inductor which forms a resonance circuit with a capacitance of the dielectric recording medium just under the first electrode; and an oscillator which oscillates at a resonance frequency of the resonance circuit. The inductor and the oscillator are placed in the vicinity of the first electrode.

According to this aspect, it is possible to realize data reproduction using SNDM. In SNDM, in order to reproduce data or information recorded in the dielectric (ferroelectric) material of the dielectric (ferroelectric) recording medium, it is preferable that a frequency modulation is used. To this end, the resonance circuit is formed with: the capacitance corresponding to the polarization state of a dielectric (ferroelectric) substance; and the inductor and the oscillator which oscillates at its resonance frequency. According to this aspect, this resonance circuit is formed in an extremely small form, and is placed on the arm portion. Therefore, it is possible to obtain a good S/N ratio.

In another aspect of the pickup device of the present invention, the pickup device further has an oscillator. The first electrode is placed at one end of the arm portion. The oscillator is placed at another end of the arm portion. A rotating shaft of the rotating mechanism is located between the first electrode and the oscillator.

According to this aspect, the center of gravity of the arm is set at a position near the rotating shaft and thus its rotation moment becomes small, which improves the capability of controlling the arm and the stability of the pickup device even when the device is used with it inclined, because of small unnecessary torque of the arm generated by gravity. Moreover, its electricity for controlling becomes little.

In another aspect of the pickup device of the present invention, the pickup device further has a weight. The first electrode is placed at one end of the arm portion. The weight is placed at another end of the arm portion. A rotating shaft of the rotating mechanism is located between the first electrode and the weight.

According to this aspect, the center of gravity of the arm can be set on the rotating shaft and thus its rotation moment becomes the smallest, which improves the capability of controlling. By taking a structure of the weight in which its mounting position to the arm is adjustable, it is possible to set the center of gravity of the whole arm accurately on the rotating shaft after mounting the electrode holding member, the inductor, the oscillator, and the like. Moreover, the stability of the pickup device improves even when the device is used with it inclined, because of no or little unnecessary torque of the arm generated by gravity, and its electricity for controlling becomes less.

In another aspect of the pickup device of the present invention, the rotation mechanism is a motor of rotational type.

According to this aspect, a motor shaft of rotational type is coincided with and placed on the rotating shaft of the arm portion. This motor is controlled so as to provide rotational reciprocating motion within a predetermined rotational angle range on the basis of the control signals of track search and tracking servo. A general-purpose direct current (DC) motor can be used.

In another aspect of the pickup device of the present invention, the rotation mechanism is a motor of linear movement type.

According to this aspect, the probe is placed at one end of the arm portion, and a so-called linear motor is placed at the other end of the arm portion. In this case, the rotating shaft is located between the probe and the linear motor. This motor is a relatively simple drive mechanism in which the movement of its movable part is controlled with the magnitude and direction of current flowing in a coil placed in a parallel magnetic field. The arm is controlled with this motor so as to provide rotational reciprocating motion within a predetermined range on the basis of the control signals of track search and tracking servo.

In another aspect of the pickup device of the present invention, a tip portion of the first electrode does not project from a surface of the electric holding member facing to the dielectric recording medium.

According to this aspect, the probe can be protected by the electrode holding member. Moreover, it is possible to prevent the probe from bumping against the dielectric recording medium, so that the surface of the dielectric recording medium can be also protected.

In another aspect of the pickup device of the present invention, the electric holding member has a sloping surface sloping with respect to a surface parallel to a surface of the recording medium, the sloping surface is located at a portion facing a moving direction of the recording medium.

According to this aspect, air flows generated by the dielectric recording medium rotating can be taken in between the electrode holding member and the dielectric recording medium as well-regulated flows, which stabilizes the posture of the electrode holding member and contributes to the probe's stable tracing.

In another aspect of the pickup device of the present invention, the pickup device is provided with a device for recording/reproducing information in/from the dielectric material on the basis of a scanning nonlinear dielectric microscopy (SNDM) method.

According to this aspect, the SNDM technique is applied, especially to reproducing. The SNDM reproduction technique is introduced in detail by the present inventor, Yasuo Cho, in Oyo Butsuri Vol. 67, No. 3, p327 (1998). Alternatively, it is also described in detail in Japanese Patent Application No. 2001-274346 and No. 2001-274347, etc., filed by the present inventors. Namely, in this technique, a probe scans over a dielectric (ferroelectric) substance to detect the capacitance corresponding to the nonlinear dielectric constant of the dielectric (ferroelectric) substance. The data or information is recorded as the polarization directions of the dielectric (ferroelectric) substance. The nonlinear dielectric constant of the dielectric (ferroelectric) substance is changed according to the polarization direction. Therefore, by detecting the capacitance corresponding to the nonlinear dielectric constant of the dielectric (ferroelectric) substance, the data or information recorded in the dielectric (ferroelectric) substance can be read. On the other hand, the data is recorded by applying an electric field to the dielectric (ferroelectric) substance from the probe, or from the lower electrode formed in the dielectric (ferroelectric) substance and thus making the polarization to be in a predetermined direction. Extremely high-density recording becomes possible. Incidentally, the probe is not limited to single use, such as the one for recording or the one for reproducing, but may be sharable as the one for recording and reproducing.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Figure 1A:
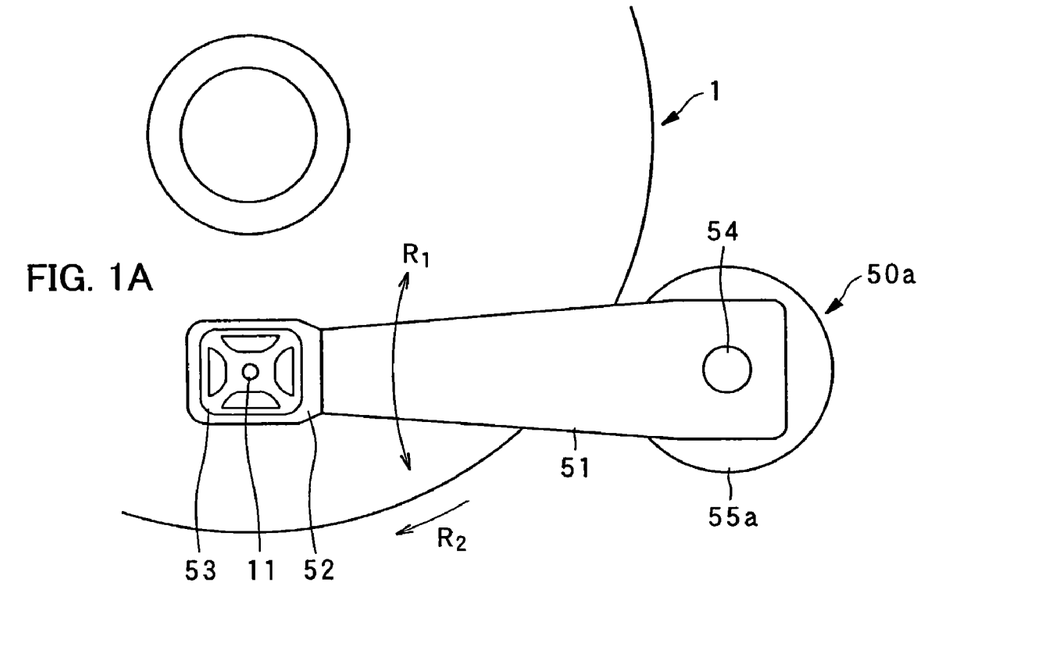
FIG. 1A is a plan view showing a structure example of a pickup device associated with the present invention using a motor of rotational type.
Figure 1B:
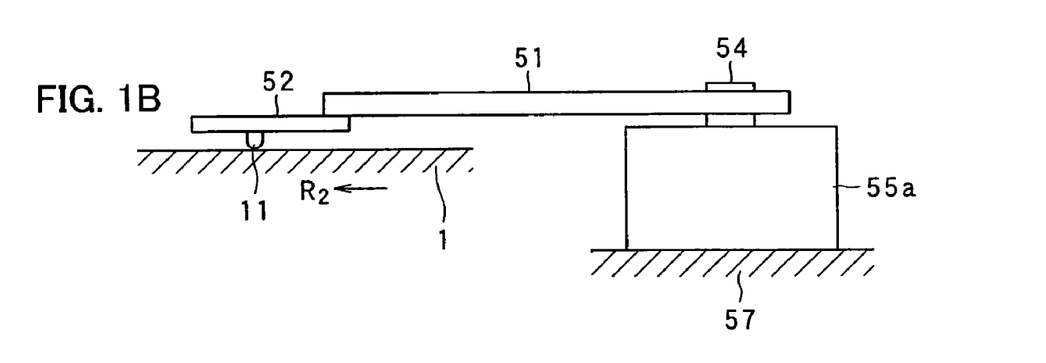
FIG. 1B is a side view of FIG. 1A.
Figure 2A:
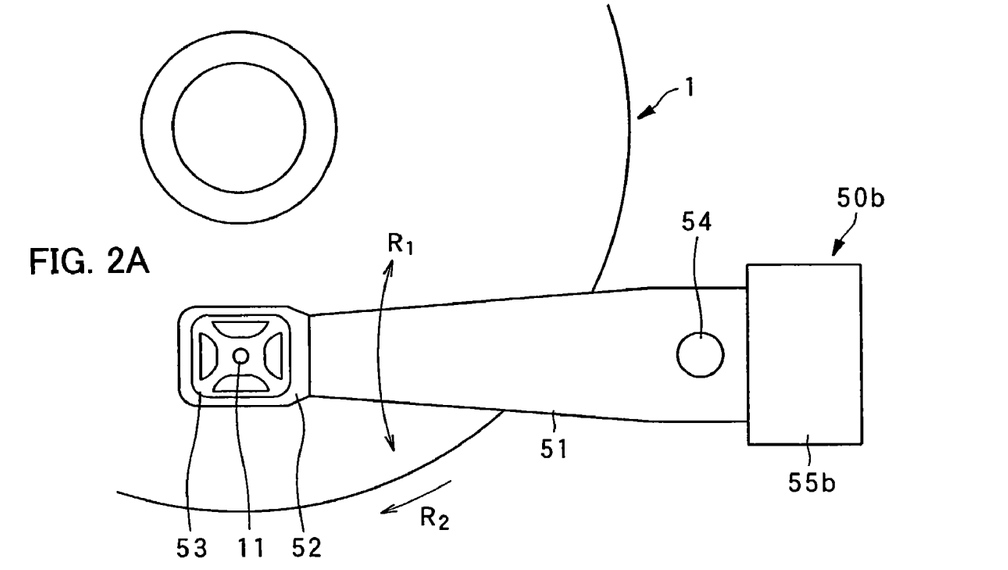
FIG. 2A is a plan view showing a structure example of another type of pickup device associated with the present invention using a linear motor.
Figure 2B:
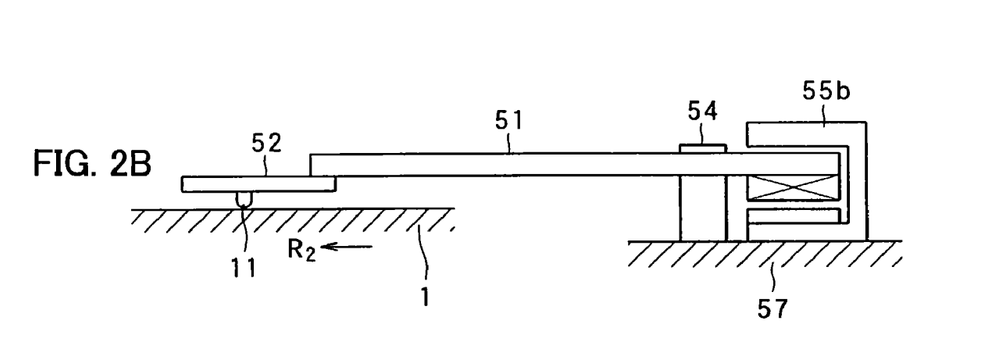
FIG. 2B is a side view of FIG. 2A.
Figure 3A:
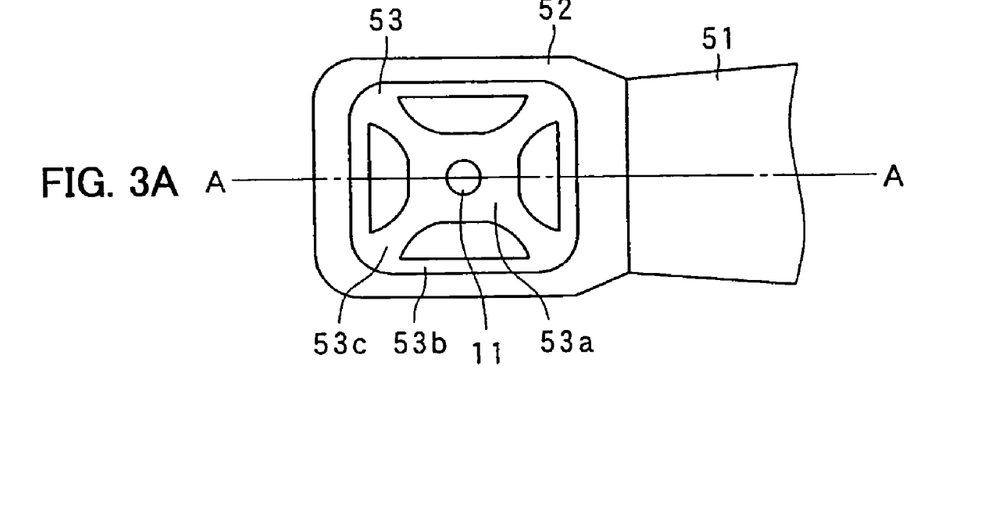
FIG. 3A is an enlarged plan view showing one end portion of the pickup device.
Figure 3B:
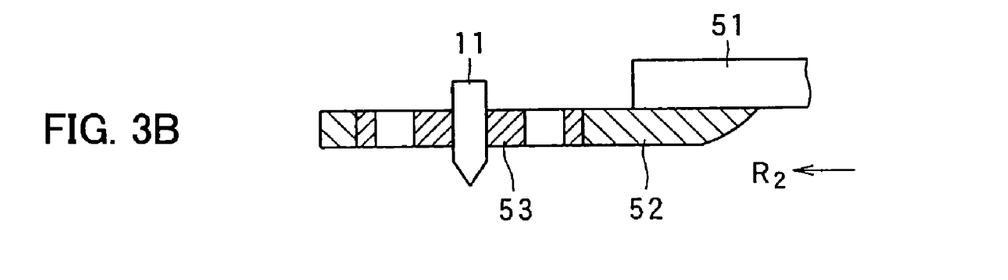
FIG. 3B is an A-A cross sectional view of FIG. 3A, with a probe holding device containing an insulator.
Figure 3C:
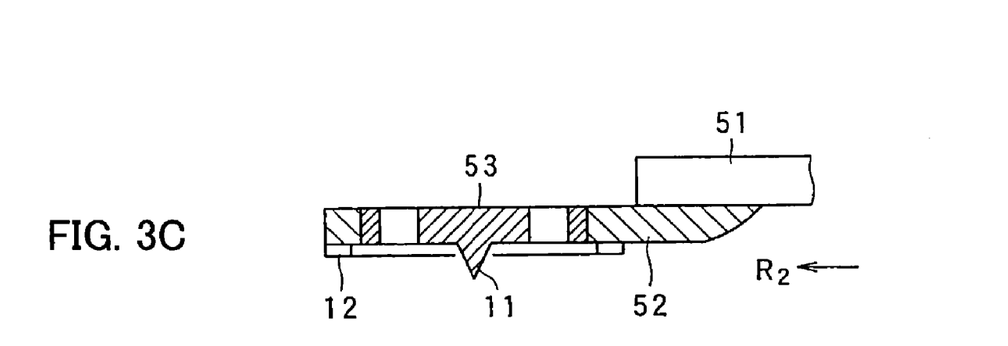
FIG. 3C is a sectional view of one end portion of another type of pickup device, with a probe and a probe holding device unified.

The embodiments of the pickup device associated with the present invention will be explained with reference to FIG. 1A to FIG. 3C. FIG. 1A is a plan view showing a structure example of a pickup device using a motor of rotational type. FIG. 1B is a side view of FIG. 1A. FIG. 2A is a plan view showing a structure example of the pickup device using a linear motor. FIG. 2B is a side view of FIG. 2A. FIG. 3A is an enlarged plan view showing one end portion of the pickup device. FIG. 3B is an A-A cross sectional view of FIG. 3A, with a probe holding device containing an insulator. FIG. 3C is an A-A cross sectional view of FIG. 3A, with a probe and a probe holding device unified.

As shown in FIG. 1A and FIG. 1B, a pickup device 50a is provided with: an arm 51; a gimbal holding device 52 disposed on one end portion of the arm 51; a gimbal 53 held by the gimbal holding device 52; and a motor 55a of rotational type for rotating the arm 51 around a rotating shaft 54. A probe 11 is set in the central portion of the gimbal 53. Although FIG. 1A and FIG. 1B show only one probe 11, a plurality of probes can be provided if the gimbal 53 contains an insulation material to ensure insulating performance between the probes.

The pickup device 50a is placed with the motor 55a fixed on a base 57 in the surrounding portion of a ferroelectric recording medium 1. The arm 51 is rotated by the motor 55a around the shaft 54 in the direction shown with an arrow R1, i.e. in the radial direction of the ferroelectric recording medium 1. Taking the direction of an arrow R2 as the rotation direction of the ferroelectric recording medium 1, the arm 51 is set with the longitudinal direction of the arm 51 coinciding with the direction of the arrow R2.

As a material of the arm 51, a light material, such as aluminum, may be used. The arm 51 has high-speed response. Moreover, in order to ensure its strength, highly accurate bending fabrication or the like is performed. One end portion of the arm 51 has a structure for fixing the gimbal holding device 52, and the other end portion of the arm 51 has a structure for fixing the arm 51 to the shaft 54. The arm 51 moves in the direction of the arrow R1 on the basis of a tracking control signal, a track address signal or the like in order to perform the tracking control and the positioning control of the probe 11.

The gimbal holding device 52 is fixed to the arm 51 with the gimbal 53 attached. The gimbal 53 and the gimbal holding device 52 may be formed in one piece with an insulating member.

The gimbal 53 has the probe 11 fixed in its center and maintains itself basically parallel to a recording surface of the ferroelectric recording medium 1. The gimbal 53 transforms in the vertical direction, pitch direction and roll direction so as to absorb irregularity or vibration of the recording surface of the ferroelectric recording medium 1 and an inclination of the recording surface caused in an assembling. On the other hand, the shape of the gimbal 53 exhibits high tracking capability for tracking control.

The rotating shaft 54 fixes the arm 51 and becomes the center of the rotation of the arm 51. If a motor of rotational type is used as the motor, the rotating shaft of the motor is used directly as the rotating shaft of the arm 51.

As shown in FIG. 2A and FIG. 2B, a pickup device 50b uses a motor 55b of linear type to rotate the arm 51. The rotating shaft 54 is fixed with the motor 55b on the base 57. The other components, functions and operations are the same as those of the above-described pickup device 50a.

Next, the gimbal and its peripheral structure, which holds the gimbal, will be explained with reference to FIG. 3A to FIG. 3C. The gimbal 53, as shown in FIG. 3A, is provided with: a center portion 53a to which the probe 11 is fixed; a peripheral portion 53b attached to the gimbal holding device 52; and a connection portion 53c located between them.

In FIG. 3B, the gimbal 53 contains an insulator and the gimbal holding device 52 contains an electric conductor. The probe 11 is electrically insulated from the gimbal holding device 52 and the arm 51. Earthing this gimbal holding device 52 allows it to be used as a return electrode for returning an electric field applied from the probe 11. A slope given to an end surface of the gimbal holding device 52, which faces to the rotation direction of the ferroelectric recording medium 1 shown with the arrow R2, adjusts air flows and stabilizes the trace of the probe 11.

In FIG. 3C, the gimbal 53 and the probe 11 are formed in one piece, containing an electric conductor, and the gimbal holding device 52 contains an insulator. The probe 11 and the gimbal 53 are electrically insulated from the arm 51. The gimbal holding device 52 is provided with a thin-film electric conductor on its surface facing to the ferroelectric recording medium 1 so as to surround the gimbal 53. Earthing this thin-film electric conductor allows it to be used as a return electrode 12 for returning a high-frequency electric field applied from the probe 11. A slope given to an end surface of the gimbal holding device 52, which faces to the rotation direction of the ferroelectric recording medium 1 shown with the arrow R2, adjusts air flows and stabilizes the trace of the probe 11.

First Embodiment of Pickup Device

The first embodiment of the pickup device will be explained with reference to FIG. 4. In the first embodiment, the above-described pickup device is equipped with an oscillator and its peripheral circuit elements for recording/reproducing data.

Figure 4:
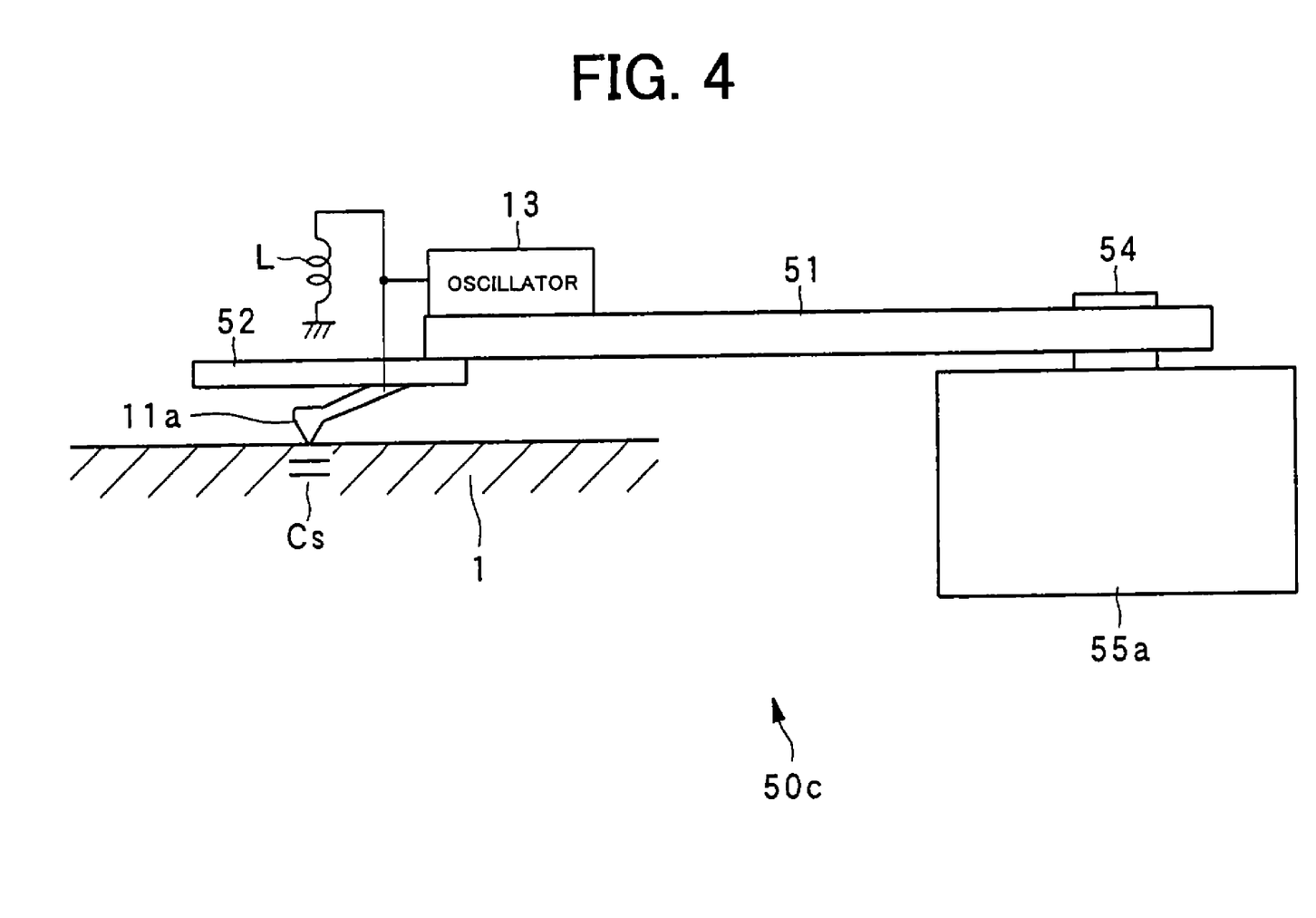
FIG. 4 is a schematic diagram showing a first example of the pickup device.

As shown in FIG. 4, on one end portion of a pickup device 50c, there are disposed an inductor L, which forms a resonance circuit with a capacitance Cs corresponding to the polarization state of the ferroelectric recording medium 1 just under a probe 11a, and an oscillator 13, which oscillates at a resonance frequency formed by the capacitance Cs and the inductor L. This resonance frequency is about 1 GHz, for example.

A motor of linear type may be used in place of the motor 55a of rotational type. Moreover, FIG. 4 shows the probe 11a of a cantilever type, but a pin or needle-shaped electrode may be used.

Second Embodiment of Pickup Device

Figure 5:
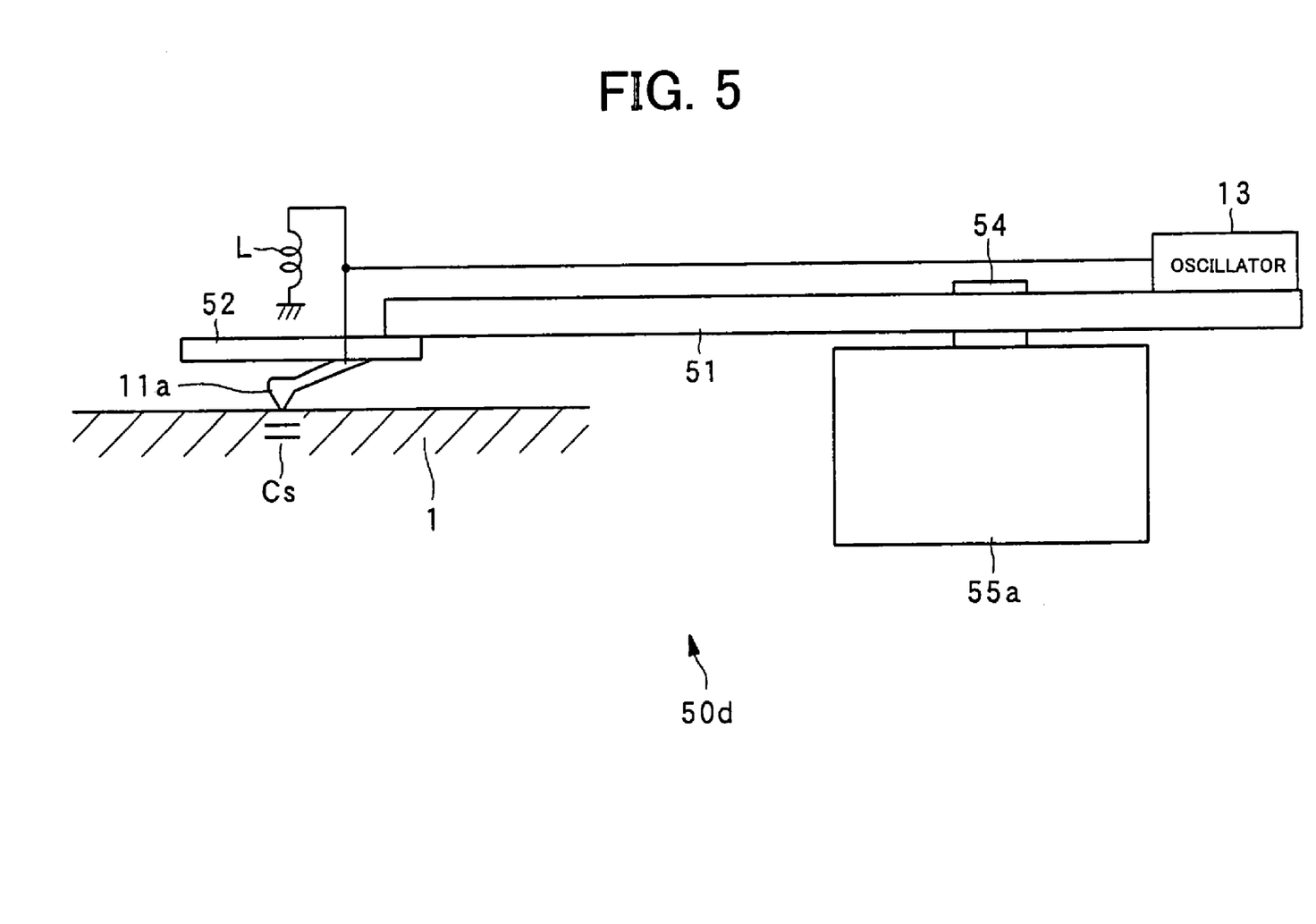
FIG. 5 is a schematic diagram showing a second example of the pickup device.

The second embodiment of the pickup device will be explained with reference to FIG. 5. In the second embodiment, the above-described pickup device is equipped with an oscillator and its peripheral circuit elements for recording/reproducing data. As shown in FIG. 5, on one end portion of a pickup device 50d, there is disposed the inductor L, which forms a resonance circuit with the capacitance Cs corresponding to the polarization state of the ferroelectric recording medium 1 just under the probe 11a. The oscillator 13, which oscillates at a resonance frequency formed by the capacitance Cs and the inductor L, is disposed on the arm 51. In the pickup device 50d, the probe 11a is placed at one end of the arm 51. The oscillator 13 is placed at the other end of the arm 51. The rotating shaft 54 is located between the probe 11a and the oscillator 13.

The center of gravity of the pickup device 50d is set at a position near the rotating shaft 54, which improves the capability of controlling the arm and the stability of the motion of the pickup 50d even when the device is used with it inclined, because of small unnecessary torque generated by gravity. Incidentally, a motor of linear type may be used in place of the motor 55a of rotational type, and a pin or needle-shaped electrode may be used in place of the probe 11a of a cantilever type.

Third Embodiment of Pickup Device

Figure 6:
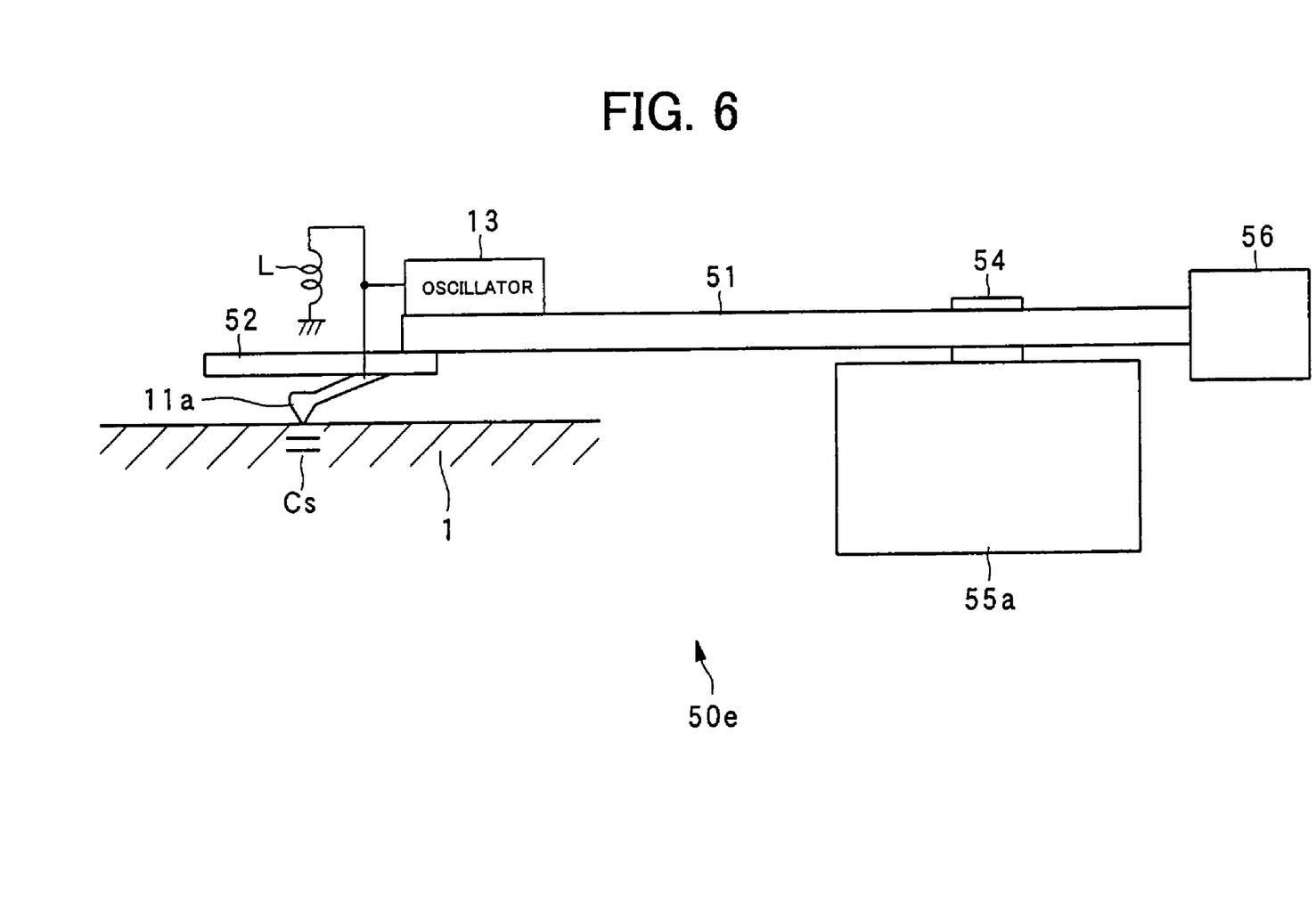
FIG. 6 is a schematic diagram showing a third example of the pickup device.

The third embodiment of the pickup device will be explained with reference to FIG. 6. In the third embodiment, the above-described pickup device is equipped with an oscillator and its peripheral circuit elements for recording/reproducing data, as well as a weight for adjusting the position of the center of gravity of the arm, i.e., a counter weight. As shown in FIG. 6, on one end portion of a pickup device 50e, there are disposed the inductor L, which forms a resonance circuit with the capacitance Cs corresponding to the polarization state of the ferroelectric recording medium 1 just under the probe 11a, and an oscillator 13, which oscillates at a resonance frequency formed by the capacitance Cs and the inductor L. A counter weight 56 is disposed oppositely to the one end portion of the pickup device 50*e* over the rotating shaft 54. This counter weight 56 is attached after determining its weight and mounting position so that the center of gravity of the pickup device 50*e* is on the rotating shaft 54.

Therefore, it is possible to coincide the center of gravity in the rotating portion of the pickup device 50*e* with the rotating shaft 54, further improving the capability of controlling the arm. Moreover, the pickup may be more preferably used for a portable apparatus or the like even when the pickup is used with it inclined, because of no or little unnecessary torque generated by gravity.

Figure 7A:
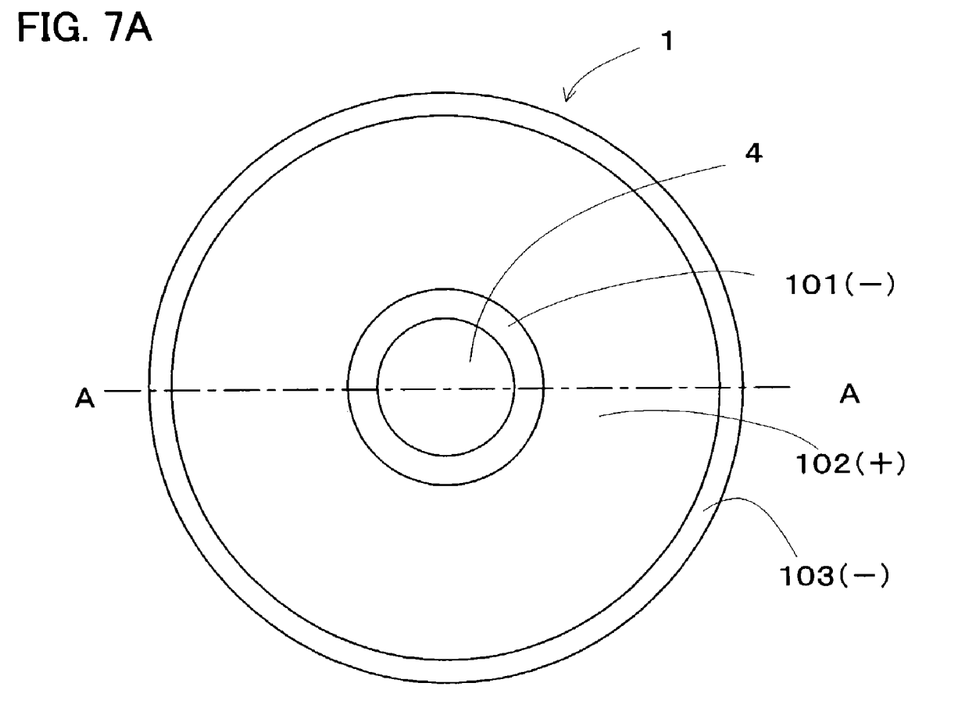
FIG. 7A and FIG. 7B are schematic diagrams showing one example of a ferroelectric recording medium used for a dielectric recording/reproducing apparatus of the present invention.

An example of the ferroelectric recording medium in which the recording/reproducing of data is performed by the pickup device of the present invention will be explained with reference to FIG. 7A and FIG. 7B. As shown in FIG. 7A, the ferroelectric recording medium 1 in a disk form is provided with: a center hole 4; an inner area 101; a recording area 102; and an outer area 103, arranged concentrically from the inside in this order.

The inner area 101, the recording area 102 and the outer area 103 contain a uniform and flat ferroelectric material. If the recording area 102 has an up polarization direction, i.e. being a plus surface, the inner area 101 and the outer area 103 have down polarization directions, i.e. being a minus surface, and vice versa.

The recording area 102 in which data is recorded has tracks and spaces, each of which is between two of the tracks, and is provided with areas in which control information about the recording/reproducing is recorded, in the track and the space. The inner area 101 and the outer area 103 are used to recognize the inner and outer positions of the ferroelectric recording medium 1.

Figure 7B:
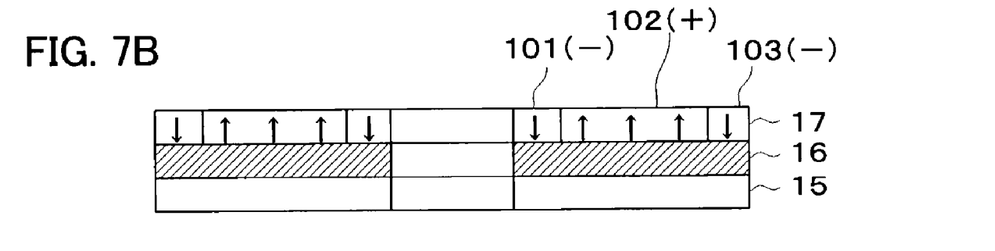

As shown in FIG. 7B, the ferroelectric recording medium 1 is provided with: a substrate 15; an electrode 16 laminated on the substrate 15; and a ferroelectric material 17 laminated on the electrode 16. The inner area 101, the recording area 102 and the outer area 103 are independently polarized to be in the directions shown with arrows.

The substrate 15 may be Si, for example, which is a preferable material due to its strength, chemical stability, workability and the like. The electrode 16 is intended to generate an electric field between the electrode 16 and the probe 11 of the recording/reproducing head and applies to the ferroelectric material 17 an electric field stronger than the coercive electric field of the ferroelectric material 17 to determine the polarization direction. Data is recorded by determining the polarization direction correspondingly to the data.

As the ferroelectric material 17, $LiTaO_3$ may be used, for example. The recording is performed with respect to the Z surface of the $LiTaO_3$, where a plus surface and a minus surface of the polarization are in a 180-degree domain relationship. Other ferroelectric materials may be used.

Dielectric Recording/Reproducing Apparatus Using Pickup Device of the Present Invention)

Figure 8:
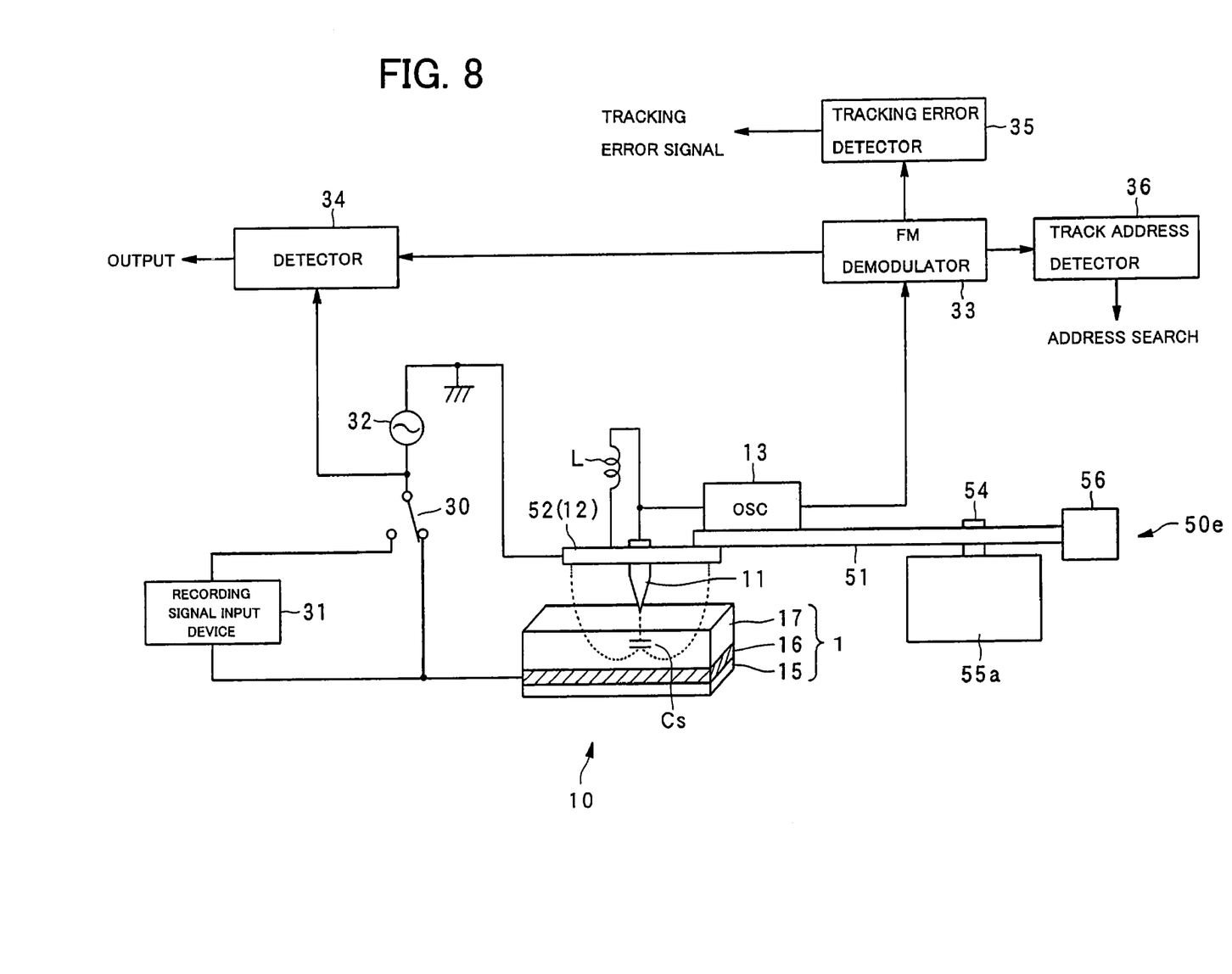
FIG. 8 is a block diagram showing a block configuration associated with recording/reproducing signal processing of the dielectric recording/reproducing apparatus of the present invention.

An example of the dielectric recording/reproducing apparatus using the pickup device associated with the present invention will be explained with reference to FIG. 8.

The pickup 50*e*, which is used for a dielectric recording/reproducing apparatus 10, is provided with: the arm 51; the gimbal holding device 52 shown in FIG. 3A to FIG. 3C; the rotating shaft 54; the motor 55*a*; and the counter weight 56, and is further provided with: the probe 11; the inductor L; and the oscillator 13. The return electrode 12 and the gimbal 53 are provided for the gimbal holding device 52. It is also possible to use the one end of the arm 51 as the return electrode 12.

The probe 11 is a conductive member, or an insulating member coated with a conductive film. The tip portion facing to the ferroelectric material is hemispherical, having a predetermined radius. This radius is an important factor in determining the radius of the polarization formed in the ferroelectric material 17 correspondingly to record data and determines the recording density, so it is extremely small, on the order of 10 nm. Data is recorded by applying a voltage to this probe 11 to form in the ferroelectric material a domain polarized in a predetermined direction, while the recorded data is picked up on the basis of the capacitance corresponding to the polarization.

The return electrode 12 is an electrode for returning the electric field generated by the oscillator 13 and applied to the ferroelectric material from the probe 11, and is placed so as to surround the probe 11. In the SNDM method, the change of the capacitance corresponding to a nonlinear dielectric constant of the ferroelectric material is directly detected. To detect this change of the capacitance, it is preferable that a compact oscillating circuit is formed on or above one surface of the ferroelectric recording medium. In this example, the oscillating circuit (resonance circuit) is provided with the oscillator 13, the inductor L, the probe 11, and the return electrode 12. In this oscillating circuit, the high-frequency signal flows from the probe 11 to the return electrode 12 thorough the ferroelectric material 17, as shown in FIG. 8. This route is a part of the oscillating circuit. It is preferable that this route is short in order to reduce noises due to a floating capacitance C0 and the like. The return electrode 12 is disposed so as to surround the probe 11 and the distance between the probe 11 and the return electrode 12 is very short. Therefore, the route that the high-frequency signal flows can be shortened, so that the noises can be reduced.

The inductor L is placed between the probe 11 and the return electrode 12, and may be formed with a microstrip-line, for example. The resonance frequency of the resonance circuit containing the oscillator 13, the inductor L, the probe 11 and the return electrode 12 is determined by the inductor L and the capacitance Cs. The inductance of the inductor L is determined so that this resonance frequency, $f=1/2\pi\sqrt{LCs}$, is about 1 GHz, for example. Incidentally, the capacitance factor to determine the resonance frequency f is not only the capacitance Cs but also the floating capacitance C0. However, since the recording/reproducing head of the present invention takes a structure for compact placement in view of the floating capacitance C0, the C0 can be assumed to be practically a constant when reproducing a signal by the SNDM. The resonance frequency f is simply expressed here as a function of the capacitance Cs and the inductor L because what changes the f in the signal reproduction is a capacitance change $\Delta Cs$ of the Cs. In fact, however, the capacitance includes the floating capacitance C0, and has implications of Cs+C0.

The change of the capacitance Cs corresponds to the nonlinear dielectric constant of the ferroelectric material 17 located just under the tip of the probe 11. The nonlinear dielectric constant of the ferroelectric material 17 located just under the tip of the probe 11 is determined according to the polarization direction of the ferroelectric material 17 at this part. In the state that data was recorded in the recording area 102 of the ferroelectric material 17, the polarization directions of the ferroelectric material 17 within the recording area 102 are changed and set according to the data (e.g.

a bit sequence of the data). Therefore, the change of the capacitance Cs is changed according to the data recorded in the ferroelectric material 17.

The oscillator 13 is an oscillator which oscillates at a frequency determined from the inductor L and the capacitance Cs. The oscillation frequency varies, depending on the change of the capacitance Cs. Therefore, FM modulation is performed correspondingly to the change of the capacitance Cs determined by the polarization domain corresponding to the recorded data. By demodulating this FM modulation, it is possible to read the recorded data.

In recording/reproducing signal processing, a recording signal input device 31 and an Alternating Current (AC) signal generation device 32 are connected, when recording, by a switch 30 for switching an input signal in recording/reproducing, and thus signals are supplied to the electrode 16 of a ferroelectric recording medium 1. On the other hand, only the AC signal generation device 32 is connected when reproducing.

When recording, a recording signal from the recording signal input device 31 is supplied to the electrode 16. By an electric field between the probe 11 and the electrode 16, the polarization of a domain of the ferroelectric material 17 just under the probe 11 is determined. Then, the polarization direction is fixed and becomes record data. Incidentally, the AC signal of the AC signal generation device 32 is superimposed on the recording signal. This is used for monitoring the recorded data which is now recorded while the data recording is performed. The process of monitoring the recorded data is the same as the process of reproducing the recorded data. Concretely, the oscillator 13 oscillates at a resonance frequency determined from the inductor L and the capacitance Cs, and the frequency is modulated by the capacitance Cs. This FM-modulated wave is demodulated at a FM demodulator 33, and this is inputted to a detector 34. Moreover, the AC signal from the AC signal generation device 32 is also inputted to the detector 34. On the basis of the signal, the coherent detection of the signal demodulated at the FM demodulator 33 is performed to reproduce the recorded data. Namely, it is possible to monitor the recording state while recording.

When reproducing, the recording signal input device 31 is disconnected by the switch 30, and only the AC signal is supplied to the electrode 16. The oscillator 13 oscillates at a resonance frequency formed by the inductor L and the capacitance Cs in the domain already polarized correspondingly to data. Therefore, the oscillation signal is FM-modulated by the capacitance Cs, and this signal is demodulated at the FM demodulator 33 and is inputted to the detector 34. Moreover, the AC signal from the AC signal generation device 32 is also inputted to the detector 34. On the basis of the signal, the coherent detection of the signal demodulated at the FM demodulator 33 is performed to reproduce the recorded data.

At the time of the above-described recording and reproducing, a tracking error signal and a track address for controlling the apparatus are detected from the signal demodulated at the FM demodulator 33. The tracking error signal is detected at a tracking error detector 35, and the detected tracking error signal is inputted to the motor 55a for tracking control. The track address is detected at a track address detector 36, and while referring to the track address, the probe 11 is moved by the pickup device to a target track position.

Incidentally, the recording signal and the AC signal can be inputted from the side of the probe 11. In this case, it is preferable that a filter is prepared in order to prevent the leakage of the signals into the oscillator 13. At this time, the electrode 16 is earthed. Moreover, if there are a plurality of probes 11, it is preferable to take this form.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-200077 filed on Jul. 9, 2002 including the specification, claims, drawings and summary is incorporated herein by reference in its entirety.

What is claimed is:

1. A pickup device for a dielectric recording/reproducing apparatus using a dielectric material as a recording medium, comprising:
   a first electrode for applying an electric field to the dielectric material;
   an electrode holding member for holding the first electrode;
   an arm portion equipped with the electrode holding member, wherein the electrode holding member cpmrises a conductive member and is mounted on one end of the arm portion via an insulating member;
   a rotating mechanism for rotating the arm portion; and
   a second electrode for returning a high-frequency electric field applied from the first electrode to the dielectric material of the recording medium, the second electrode being placed on a surface of the insulating member facing the recording medium.

2. The pickup device according to claim 1, wherein the electrode holding member has a gimbal structure.

3. The pickup device according to claim 1, wherein the electrode holding member and the first electrode are formed in one piece.

4. The pickup device according to claim 1, wherein the rotation mechanism is a motor of rotational type.

5. The pickup device according to claim 1, wherein the rotation mechanism is a motor of linear movement type.

6. The pickup device according to claim 1, comprising a device for reproducing information recorded as polarization directions of the dielectric material of the recording medium using scanning nonlinear dielectric microscopy.

7. A pickup device for a dielectric recording/reproducing apparatus using a dielectric material as a recording medium comprising:
   a first electrode for applying an electric field to the dielectric material;
   an electrode holding member for holding the first electrode;
   an arm portion equipped with the electrode holding member;
   a rotating mechanism for rotating the arm portion; and
   a second electrode for returning a high-frequency electric field applied from the first electrode to the dielectric material of the recording medium, the second electrode being placed around the electrode holding member,
   wherein the electrode holding member comprises an insulating member.

8. The pickup device according to claim 7, wherein one end of the arm portion is used as the second electrode.

9. The pickup device according to claim 7, wherein a plurality of the first electrodes are disposed on the electrode holding member.

10. A pickup device for a dielectric recording/reproducing apparatus using a dielectric material as a recording medium, comprising:
- a first electrode for applying an electric field to the dielectric material;
- an electrode holding member for holding the first electrode;
- an arm portion equipped with the electrode holding member;
- a rotating mechanism for rotating the arm portion;
- an inductor which forms a resonance circuit with a capacitance of the dielectric material of the recording medium just under the first electrode; and
- an oscillator which oscillates at a resonance frequency of the resonance circuit,
- wherein the inductor and the oscillator are placed in the vicinity of the first electrode.

11. A pickup device for a dielectric recording/reproducing apparatus using a dielectric material as a recording medium, comprising:
- a first electrode for applying an electric field to the dielectric material;
- an electrode holding member for holding the first electrode;
- an arm portion equipped with the electrode holding member;
- a rotating mechanism for rotating the arm portion; and
- an oscillator, wherein the first electrode is placed at one end of the arm portion, the oscillator is placed at another end of the arm portion, and a rotating shaft of the rotating mechanism is located between the first electrode and the oscillator.

12. A pickup device for a dielectric recording/reproducing apparatus using a dielectric material as a recording medium, comprising:
- a first electrode for applying an electric field to the dielectric material;
- an electrode holding member for holding the first electrode;
- an arm portion equipped with the electrode holding member;
- a rotating mechanism for rotating the arm portion; and
- a weight, wherein the first electrode is placed at one end of the arm portion, the weight is placed at another end of the arm portion, and a rotating shaft of the rotating mechanism is located between the first electrode and the weight.

13. A pickup device for a dielectric recording/reproducing apparatus using a dielectric material as a recording medium, comprising:
- a first electrode for applying an electric field to the dielectric material;
- an electrode holding member for holding the first electrode;
- an arm portion equipped with the electrode holding member; and
- a rotating mechanism for rotating the arm portion;
- wherein said electric holding member has a sloping surface sloping with respect to a surface parallel to a surface of the recording medium, the sloping surface is located at a portion facing a moving direction of the recording medium.

* * * * *